(12) United States Patent
Chiang et al.

(10) Patent No.: US 7,949,233 B2
(45) Date of Patent: May 24, 2011

(54) METHOD AND DEVICE FOR CONTROLLING A HEAT-DISSIPATING FAN FOR AN ELECTRONIC COMPONENT

(75) Inventors: Yi-Tung Chiang, Taipei Hsien (TW); I-Huei Huang, Taipei Hsien (TW); Nien-Yu Liao, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 533 days.

(21) Appl. No.: 12/062,281

(22) Filed: Apr. 3, 2008

(65) Prior Publication Data

US 2009/0129760 A1 May 21, 2009

(30) Foreign Application Priority Data

Nov. 15, 2007 (TW) ................................ 96143211 A

(51) Int. Cl.
*H02P 7/29* (2006.01)
(52) U.S. Cl. .... 388/811; 318/599; 318/634; 318/400.08
(58) Field of Classification Search .................. 388/811; 318/599, 634, 400.08
See application file for complete search history.

(56) References Cited

U.S. PATENT DOCUMENTS

| | | | | |
|---|---|---|---|---|
| 5,828,200 A * | 10/1998 | Ligman et al. | ................. | 318/807 |
| 7,038,415 B2 * | 5/2006 | Nakamura et al. | ............ | 318/471 |
| 7,142,423 B2 * | 11/2006 | Lanni | ............................ | 361/695 |
| 2008/0304303 A1 * | 12/2008 | Hsieh et al. | ................... | 363/141 |

* cited by examiner

*Primary Examiner* — Walter Benson
*Assistant Examiner* — Erick Glass
(74) *Attorney, Agent, or Firm* — The Webb Law Firm

(57) ABSTRACT

A method for controlling a heat-dissipating fan for an electronic component includes the steps of: detecting a temperature of the electronic component, and outputting a first control signal corresponding to the temperature thus detected; receiving a load current of the electronic component, and converting the load current into a second control signal; and controlling a rotating speed of the heat-dissipating fan with reference to the first control signal and the second control signal. A device employing the method includes a current detecting module adapted for detecting a load current, a temperature control circuit adapted for detecting a temperature, and a logic circuit unit coupled to the current detecting module and the temperature control circuit and controlling a rotating speed of a heat-dissipating fan.

5 Claims, 2 Drawing Sheets

METHOD AND DEVICE FOR CONTROLLING A HEAT-DISSIPATING FAN FOR AN ELECTRONIC COMPONENT

CROSS-REFERENCE TO RELATED APPLICATION

This application claims priority of Taiwanese application no. 096143211, filed on Nov. 15, 2007.

BACKGROUND OF THE INVENTION

1. Field of the Invention

The invention relates to a method and device for controlling a fan, more particularly to a method and device for controlling a heat-dissipating fan for an electronic component.

2. Description of the Related Art

Since electronic components tend to generate a lot of heat during operation, a cooling mechanism is required to ensure stable operation of electronic components. Referring to FIG. 1, a conventional cooling device 9 for a central processing unit (CPU) 90 used in a computer system is shown to include a fan controller 91 and a heat-dissipating fan 92. The fan controller 91 includes a computing unit 911 and a rotation speed control unit 912.

In operation, the central processing unit 90 outputs a temperature-sensing signal 901 to the computing unit 911 of the fan controller 91. The computing unit 911 detects a present temperature of the central processing unit 90 from the temperature-sensing signal 901. Thereafter, through a built-in algorithm, the computing unit 911 commands the rotation speed control unit 912 to output a driving signal 902 for controlling a rotating speed of the heat-dissipating fan 92. Accordingly, when the detected temperature is too high, the heat-dissipating fan 92 is driven to increase the rotating speed thereof. On the other hand, when the detected temperature is stable, the heat-dissipating fan 92 is driven to gradually reduce the rotating speed thereof. In the meantime, the heat-dissipating fan 92 outputs a feedback signal 903 to the computing unit 911. Therefore, the computing unit 911 can perform calculations according to the feedback signal 903 to permit driving of the heat-dissipating fan 92 for generating a stable air stream to cool down the central processing unit 90.

However, current methods of fan control are based on a state where the central processing unit 90 already generates heat, i.e., the resultant heat or temperature is calculated in the current methods. The current methods are unable to predict heat to be generated by the system for preemptive control of the fan so as to prevent overheating of electronic components from occurring.

SUMMARY OF THE INVENTION

Since electric current is directly proportional to power, and power is directly proportional to generated heats prediction of heat to be generated is possible through detection of electric current.

Therefore, an object of the present invention is to provide a method and device for controlling a heat-dissipating fan for an electronic component, which utilize load current to control operation of the heat-dissipating fan.

According to one aspect of the present invention, there is provided a method for controlling a heat-dissipating fan for an electronic component. The method comprises the steps of:

a) detecting a temperature of the electronic component, and outputting a first control signal corresponding to the temperature thus detected;

b) receiving a load current of the electronic component, and converting the load current into a second control signal; and c) controlling a rotating speed of the heat-dissipating fan with reference to the first control signal and the second control signal.

According to another aspect of the present invention, there is provided a device for controlling a heat-dissipating fan for an electronic component. The device comprises a current detecting module, a temperature control circuit, and a logic circuit unit. The current detecting module is adapted for detecting a load current of the electronic component. The temperature control circuit is adapted for detecting a temperature of the electronic component and for outputting a first control signal corresponding to the temperature detected thereby. The logic circuit unit includes a pulse generating circuit for receiving the load current detected by the current detecting module and converting the load current into a second control signal, and a controller for receiving the first control signal and the second control signal and controlling a rotating speed of the heat-dissipating fan with reference to the first control signal and the second control signal.

Since the load current of the electronic component is detected in the method and device for controlling a heat-dissipating fan for the electronic component according to this invention, and since the load current is converted into a control signal to serve as a basis for controlling the heat-dissipating fan, a better heat-dissipating effect can be achieved when implemented with existing temperature control circuits.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The principle behind the method for controlling a heat-dissipating fan for an electronic component according to the present invention is based on the fact that the load current of the electronic component is directly proportional to power, and power is directly proportional to generated heat. Accordingly, the effect of preemptive control is possible by using the load current as a drive signal for controlling operation of the heat-dissipating fan.

Figure 1:
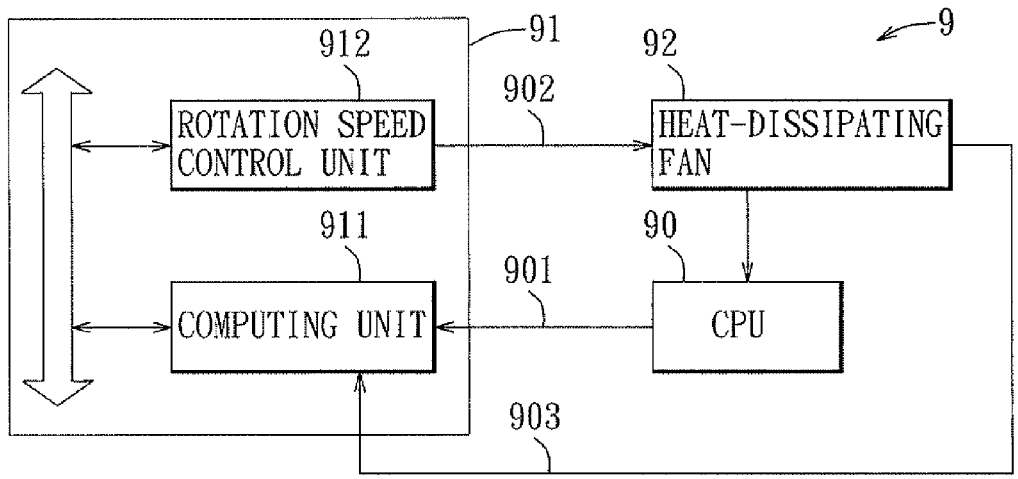
FIG. 1 is a system block diagram to illustrate a conventional computer system that adopts a conventional cooling device for a central processing unit.
Figure 2:
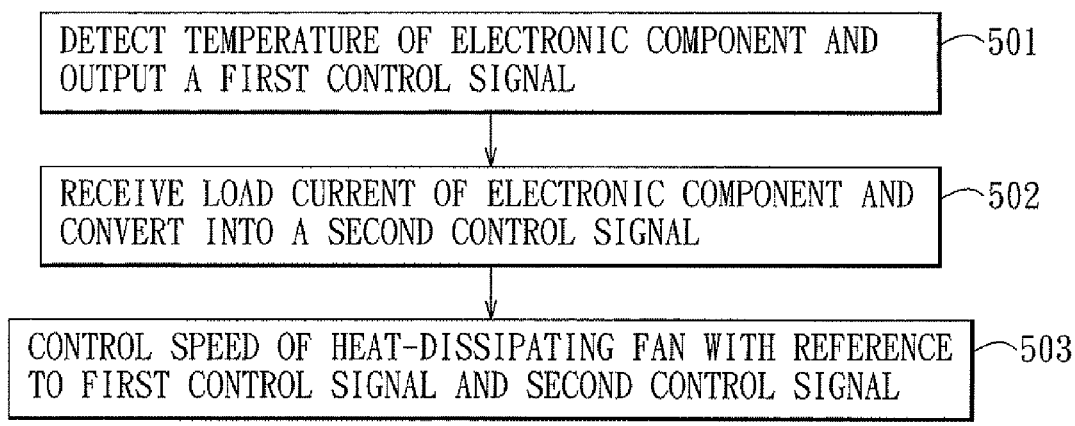
FIG. 2 is a flowchart of the preferred embodiment of a method for controlling a heat-dissipating fan for an electronic component according to the present invention.

Referring to FIG. 2, the preferred embodiment of the method for controlling a heat-dissipating fan for an electronic component according to the present invention is shown to include the steps of: detecting a temperature of the electronic component, and outputting a first control signal corresponding to the temperature thus detected (step 501); receiving a load current of the electronic component, and converting the load current into a second control signal (step 502); and controlling a rotating speed of the heat-dissipating fan with reference to the first control signal and the second control signal (step 503).

Figure 3:
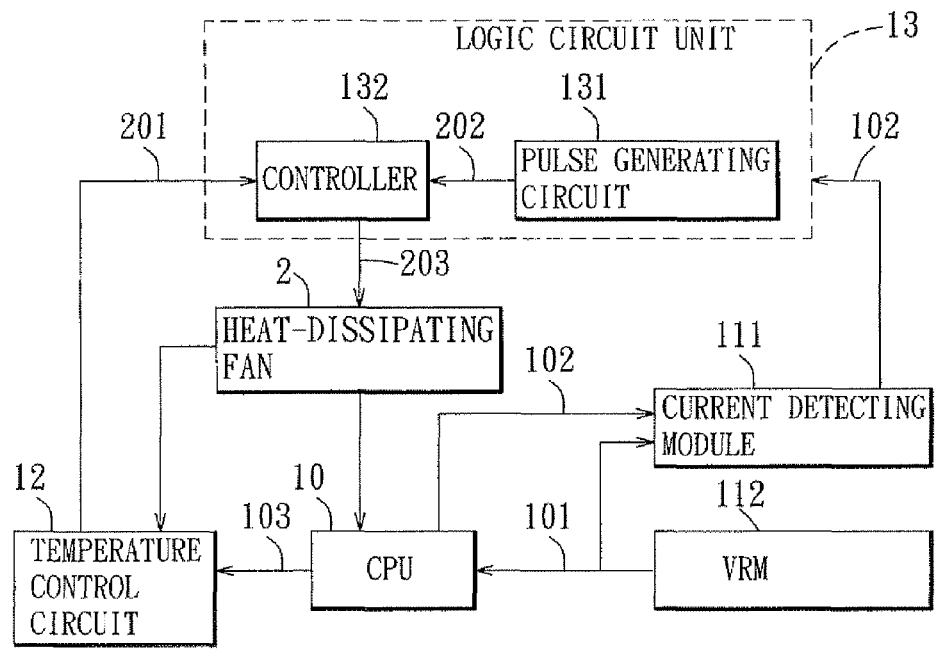
FIG. 3 is a system block diagram to illustrate the preferred embodiment of a device for controlling a heat-dissipating fan for an electronic component according to the present invention.

Referring to FIG. 3, the preferred embodiment of the device 1 according to the present invention is adapted for application to an existing computer system and is adapted for use with a heat-dissipating fan 2, a central processing unit (CPU) 10, and a voltage regulator module (VRM) 112. The device 1 includes a current detecting module 111, a temperature control circuit 12, and a logic circuit unit 13.

In this embodiment, the device 1 is adapted for controlling a rotating speed of the heat-dissipating fan 2 for cooling down the central processing unit 10. However, while the device 1 is exemplified as being used with the central processing unit 10, the device 1 may also be applied to other electronic components, such as a microprocessor in a graphics card, that easily generate heat during operation and that require heat dissipation, and to sets of electronic components that operate at high speeds, and should not be limited for application to a single central processing unit 10.

Power is provided to the central processing unit 10 by the voltage regulator module 112. The voltage regulator module 112 converts an external power source into a power source signal 101 for the central processing unit 10 and the current detecting module 111. The current detecting module 111 detects a load current 102 provided to the central processing unit 10 by the power source signal 101. In this embodiment, the load current 102 is used as a drive signal for controlling operation of the heat-dissipating fan 2 due to the fact that the load current 102 is proportional to the voltage of the power source signal 101, the load current 102 is proportional to power, and power is proportional to generated heat. Therefore, the effect of preemptive control is possible by using the load current 102 as a drive signal for controlling operation of the heat-dissipating fan 2.

The central processing unit 10 provides a temperature reading signal 103 to the temperature control circuit 12. The temperature control circuit 12 calculates an appropriate duty cycle based on the temperature reading signal 103, and generates a first control signal 201 that is provided to the logic circuit unit 13. The width of the duty cycle is used for further control of the rotating speed of the heat-dissipating fan 2. For example, when the width is relatively wide, the rotating speed is increased. On the other hand, when the width is relatively narrow, the rotating speed is decreased.

The logic circuit unit 13 includes a pulse generating circuit 131 coupled to the current detecting module 111, and a controller 132 coupled to the pulse generating circuit 131, the temperature control circuit 12 and the heat-dissipating fan 2.

Figure 4:
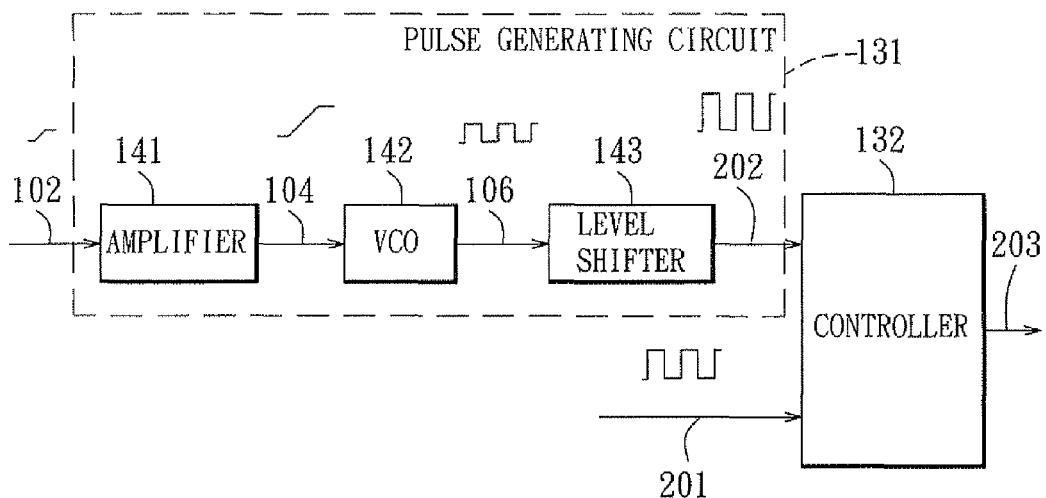
FIG. 4 is a circuit block diagram to illustrate a pulse generating circuit of the preferred embodiment.

Referring to FIGS. 3 and 4, the pulse generating circuit 131 receives the load current 102 detected by the current detecting module 111 and converts the load current 102 into a second control signal 202 that is provided to the controller 132. The pulse generating circuit 131 includes an amplifier 141 coupled to the current detecting module 111, a voltage-controlled oscillator (VCO) 142 coupled to the amplifier 141, and a level shifter 143 coupled to the voltage-controlled oscillator 142 and the controller 132. The amplifier 141 converts the load current 102 received from the current detecting module 111 into an amplified signal 104. The voltage-controlled oscillator 142 converts the amplified signal 104 from the amplifier 141 into a pulse signal 106, wherein different slopes of the amplified signal 104 correspond to different widths for the pulse signal 106. The level shifter 143 performs level-shifting upon the pulse signal 106 from the voltage-controlled oscillator 142 so as to result in the second control signal 202 that is provided to the controller 132. The purpose of level-shifting of the pulse signal 106 is for conversion into a level accepted by the controller 132 for driving operation of the controller 132.

The controller 132 receives the first control signal 201 and the second control signal 202, and is adapted to control the rotating speed of the heat-dissipating fan 2 with reference to the first control signal 201 and the second control signal 202. In particular, the control logic of the controller 132 refers to a pulse width of the first control signal 201 and a pulse width of the second control signal 202 to control the rotating speed of the heat-dissipating fan 2. For example, when the pulse width of one of the first control signal 201 and the second control signal 202 is determined by the controller 132 to be wider than that of the other one of the first control signal 201 and the second control signal 202, which indicates possible overheating or increased power consumption, the one of the first control signal 201 and the second control signal 202 with the wider pulse width is outputted as a control signal 203 to serve as a basis for controlling the rotating speed of the heat-dissipating fan 2. Therefore, if it is determined that the pulse width of the first control signal 201 is wider than that of the second control signal 202, the control signal 203 is the first control signal 201. On the other hand, if it is determined that the pulse width of the second control signal 202 is wider than that of the first control signal 201, the control signal 203 is the second control signal 202. It should be noted herein that the aforementioned control method is only a preferred embodiment explained in detail for illustrative purposes. Those skilled in the art would readily appreciate the possibility of using different algorithms for the control logic to process the second control signal 202. Therefore, the control logic of the controller 132 is not limited to what is disclosed herein.

In sum, the method and device for controlling a heat-dissipating fan for an electronic component of this invention detects a load current of the electronic component, and converts the load current into a control signal to serve as a basis for controlling the heat-dissipating fan. When implemented with existing temperature control circuits, a better heat-dissipating effect can be achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for controlling a heat-dissipating fan for an electronic component, said method comprising the steps of:
    a) detecting a temperature of the electronic component, and outputting a first control signal corresponding to the temperature thus detected;
    b) receiving a load current of the electronic component, and converting the load current into a second control signal; and
    c) controlling a rotating speed of the heat-dissipating fan with reference to the first control signal and the second control signal;
    wherein step c) comprises controlling the rotating speed of the heat-dissipating fan with reference to a pulse width of the first control signal and a pulse width of the second control signal;

wherein the step of controlling the rotating speed of the heat-dissipating fan with reference to the pulse widths of the first and second control signals in step c) comprises the sub-steps of:
(i) determining if the pulse width of one of the first control signal and the second control signal is wider than that of the other one of the first control signal and the second control signal, and
(ii) outputting said one of the first control signal and the second control signal with the wider pulse width to serve as a basis for controlling the rotating speed of the heat-dissipating fan.

2. A device for controlling a heat-dissipating fan for an electronic component, said device comprising:
a current detecting module adapted for detecting a load current of the electronic component;
a temperature control circuit adapted for detecting a temperature of the electronic component and for outputting a first control signal corresponding to the temperature detected thereby; and
a logic circuit unit including:
a pulse generating circuit coupled to said current detecting module, receiving the load current detected by said current detecting module, and converting the load current into a second control signal, and
a controller for receiving the first control signal and the second control signal and controlling a rotating speed of the heat-dissipating fan with reference to the first control signal and the second control signal;
wherein said pulse generating circuit comprises:
an amplifier for converting the load current received from said current detecting module into an amplified signal,
a voltage-controlled oscillator for converting the amplified signal from said amplifier into a pulse signal, and
a level shifter for performing level-shifting upon the pulse signal from said voltage-controlled oscillator so as to result in the second control signal that is provided to said controller.

3. The device for controlling a heat-dissipating fan for an electronic component as claimed in claim 2, wherein said controller controls the rotating speed of the heat-dissipating fan with reference to a pulse width of the first control signal and a pulse width of the second control signal.

4. A system comprising:
an electronic component;
a heat-dissipating fan;
a current detecting module for detecting a load current of said electronic component;
a temperature control circuit for detecting a temperature of said electronic component and for outputting a first control signal corresponding to the temperature detected thereby; and
a logic circuit unit including:
a pulse generating circuit coupled to said current detecting module, receiving the load current detected by said current detecting module, and converting the load current into a second control signal, and
a controller for receiving the first control signal and the second control signal and controlling a rotating speed of said heat-dissipating fan with reference to the first control signal and the second control signal;
wherein said pulse generating circuit comprises:
an amplifier for converting the load current received from said current detecting module into an amplified signal,
a voltage-controlled oscillator for converting the amplified signal from said amplifier into a pulse signal, and
a level shifter for performing level-shifting upon the pulse signal from said voltage-controlled oscillator so as to result in the second control signal that is provided to said controller.

5. The system as claimed in claim 4, wherein said controller controls the rotating speed of said heat-dissipating fan with reference to a pulse width of the first control signal and a pulse width of the second control signal.

* * * * *